UNITED STATES PATENT OFFICE

2,479,942

ALKENYLAMINOACETONITRILES

Hans Z. Lecher, Plainfield, and Robert S. Long, Somerville, N. J., assignors to American Cyanamid Company, New York, N. Y., a corporation of Maine.

No Drawing. Application January 5, 1946, Serial No. 639,406

3 Claims. (Cl. 260—465.5)

This invention relates to new alkenylaminoacetonitriles.

The compounds of the present invention may be represented by the formula RNHCH$_2$CN, wherein R is an alkenyl radical having not more than five carbon atoms, the term "alkenyl" being used to denote any monovalent aliphatic hydrocarbon radical containing a double bond. Examples of such alkenyl radicals are:

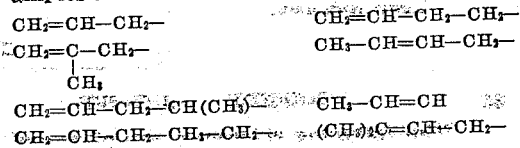

The compounds are useful for the preparation of the corresponding alkenylglycines, and are intermediates in the manufacture of dyestuffs.

The new alkenylaminoacetonitriles may be prepared by several methods. The preferred method involves several steps, the first of which is to prepare the corresponding alkenylaminomethane sulfonic acid salt. This is followed by reaction with a metal cyanide to produce the nitrile. The reactions may be illustrated by the following equations, in which R is an alkenyl radical having not more than five carbon atoms.

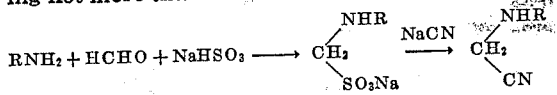

In the first step it is preferable to use substantially stoichiometrical quantities of the alkenylamine and alkali metal formaldehyde bisulfite solution. This gives the best results and is preferred. The formaldehyde alkali metal bisulfite solution is suitably prepared, for example, by dissolving sodium meta disulfite in water to give approximately a 40% solution, cooling to 20° C. or lower, and adding an equivalent amount of commercial 37% formaldehyde solution. The formaldehyde bisulfite solution is then added to an equivalent amount of the aqueous alkenylamine solution, preferably using external cooling to maintain the temperature at about 20° C. A slightly better yield results when the formaldehyde bisulfite is added to the amine, rather than in the reverse order.

The alkali metal salt of the alkenylaminomethane sulfonic acid can be isolated, if desired, by evaporating the aqueous solution to dryness, preferably under reduced pressure. The neutral compound can be obtained from the alkali metal salt by dissolving in a minimum amount of water, clarifying the resulting solution, if necessary, and then acidifying with a very slight excess of mineral acid.

The alkenylaminomethane sulfonic acid can also be obtained by first forming the Schiff's base by reaction of the alkenylamine with formaldehyde and then passing in sulfur dioxide until precipitation occurs, but this reaction is difficult to carry out in larger scale operations and the yield is low. There is a tendency for any excess sulfur dioxide to react with the alkenyl group at the C=C bond to give complicating side reactions.

The solution of the alkali metal salt of the alkenylaminomethane sulfonic acid, prepared as described above and containing no excess bisulfite, is added to an equivalent quantity of technical grade metal cyanide in aqueous solution. The order of addition here is unimportant, the yields being approximately the same in either case. The temperature is preferably kept below 20° C., although as in the first step, the temperature is not critical. This is an advantage of the process as delicate temperature controls are not necessary.

After the addition of the metal cyanide is complete the mixture may be stirred for a number of hours until the reaction has gone to completion. This may take place at room temperature or, if it is desired to speed up the reaction, moderate heating, for example up to about 70° C. may be used without seriously lowering the yield.

In order to obtain maximum yields of the alkenylaminoacetonitrile the dilution of the reaction mixture requires some attention. The best concentration will vary a little with the particular nitrile, but in general should be at least 13% of the total reaction mixture (assuming quantitative conversion of the nitrile). Substantially decreased concentrations result in the lowering of yield. On the other hand, higher concentrations may be used but the improvement in yield is very slight and if the concentration becomes too high certain operating difficulties arise.

When the optimum volume of water has been used for the reaction, the alkenylaminoacetonitrile will separate from the reaction mixture as an upper layer which is an aqueous mixture of the nitrile containing also some sodium sulfite. To remove this water, a suitable solvent, for example chlorobenzene, is added to the reaction mixture. In this way, a nearly anhydrous solution of the nitrile in the solvent is obtained. If too little water has been used during the reaction, it may be necessary to dilute the mixture after reaction is complete to avoid emulsion formation during the extraction of the nitrile. The use of a solvent serves the additional advantage of extracting from the aqueous solution a small amount of the nitrile which remains dissolved in it. The nitrile is obtained by distilling off the solvent.

For practical purposes sodium formaldehyde bisulfite and sodium cyanide are preferred because of their cheapness. However, the particular metal is not important and any water soluble metallic salt may be used. For example, when potassium cyanide is used in place of sodium cyanide in the second step the yields are slightly higher, but not sufficiently so to justify the added cost. Other metal salts give satisfactory results and may be used wherever the economies of the operation permit.

It is an advantage of the process of our invention that the nitrile is obtained in a form sufficiently pure that it is unnecessary to isolate and further purify the nitrile for further reaction. For example, in case it is to be used for the preparation of the corresponding alkenylglycine, hydrolysis may be brought about by slowly adding the solution of the nitrile in the solvent to an equivalent quantity of dilute caustic alkali solution, heated to 90–95° C. After separating the solvent and distilling to remove the ammonia, alkenylglycine of sufficient purity is obtained in aqueous solution.

The invention will be more fully set forth in connection with the following specific examples, which are illustrative only and not by way of limitation. All parts are by weight.

EXAMPLE 1

*Preparation of allylaminoacetonitrile*

A solution of 101 parts of technical sodium meta-bisulfite in 228 parts of water is cooled below 20° and treated with 81.1 parts of commercial 37% formaldehyde. The resulting solution of the sodium bisulfite-formaldehyde addition compound is then added slowly to a cooled solution of 57 parts of allylamine in 75 parts of water. The reaction is immediate and exothermic and it is advisable to use external cooling to hold the temperature below about 20° C. To the resulting solution of sodium allylaminomethane sulfonate is added a solution of 51.2 parts of technical sodium cyanide in 150 parts of water. The reaction mixture is then stirred at room temperature for a number of hours during which time the desired nitrile separates along with some water as the upper layer. It is isolated in excellent yield by extraction with 81.1 parts of chlorobenzene and distillation of the chlorobenzene solution. Allylaminoacetonitrile is a colorless liquid distilling at 60° C. under a vacuum of 5 mm. of mercury.

EXAMPLE 2

*Preparation of methallylaminoacetonitrile*

When the procedure of Example 1 is followed with the substitution of 74 parts of 96% methallylamine for the allylamine, methallylaminoacetonitrile is obtained in excellent yield. It is a colorless liquid having a boiling point of 105° C. under a vacuum of 34 mm. of mercury.

We claim:

1. As new chemical compounds, the alkenylaminoacetonitriles having the following formula

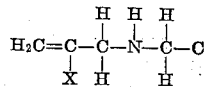

wherein X represents a substituent selected from the class consisting of hydrogen and a methyl group.

2. As a new chemical compound, allylaminoacetonitrile.

3. As a new chemical compound, methallylaminoacetonitrile.

HANS Z. LECHER.
ROBERT S. LONG.

REFERENCES CITED

The following references are of record in the file of this patent:

UNITED STATES PATENTS

| Number | Name | Date |
|---|---|---|
| 2,228,271 | Jacobson et al. | Jan. 14, 1941 |
| 2,328,940 | Alderson et al. | Sept. 7, 1943 |
| 2,375,016 | Marple et al. | May 1, 1945 |

FOREIGN PATENTS

| Number | Country | Date |
|---|---|---|
| 460,372 | Great Britain | Jan. 26, 1937 |
| 792,962 | France | Nov. 7, 1935 |